July 4, 1950   L. S. RAWSON   2,513,744
NO-DRAFT VENTILATOR WINDOW
Filed Nov. 8, 1946
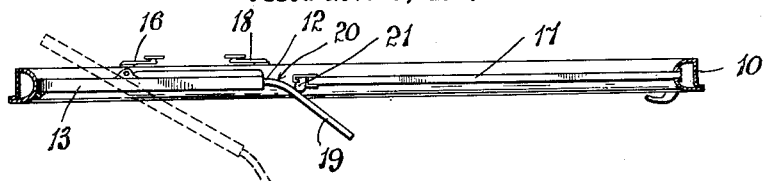
Fig. 2.
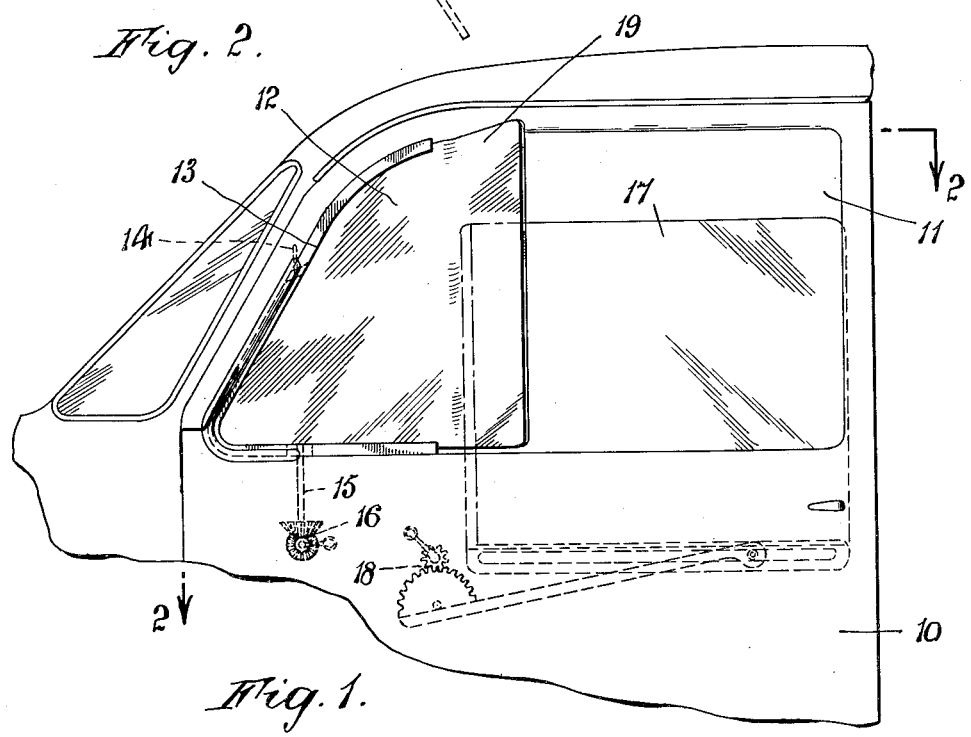
Fig. 1.
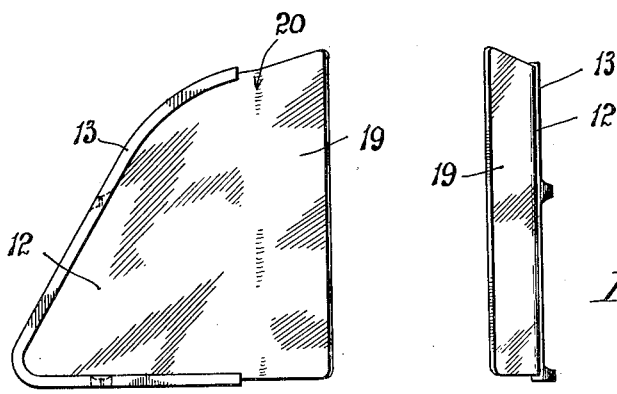
Fig. 3.
Fig. 4.
INVENTOR.
Leroy S. Rawson
BY
Stanley Lightfoot
ATTORNEY Patented July 4, 1950

2,513,744

UNITED STATES PATENT OFFICE 2,513,744

NO-DRAFT VENTILATOR WINDOW

Leroy S. Rawson, Detroit, Mich., assignor, by mesne assignments, to Axel C. Wickman, Detroit, Mich.

Application November 8, 1946, Serial No. 708,692

1 Claim. (Cl. 296—44)

This invention relates to ventilators for automobiles and other vehicles and, more particularly, to that type of ventilator which forms part of the glass or transparency of a side window and is adapted to deflect an air current (resulting from the motion of the vehicle) outwardly of the window opening to thereby induce a corresponding suction of air through the said opening from the interior of the vehicle and thus promote a circulation of air within the vehicle.

Many such forms of so-called "no-draft" ventilators have been heretofore proposed and used, the most commonly known type being in the form of a wing or forward pane section of a window, said section being pivoted in the window frame for angular adjustment with respect to the rear section of such pane whereby such front pane section may project inwardly of the car while the rear portion projects outwardly thereof in laterally spaced relation to the front edge of the said rear section of the pane. In the closed position of the front section or wing, the rear edge thereof substantially abuts the front edge of the rear section of the pane so that the two sections occupy a common plane throughout.

The foregoing arrangement has certain disadvantages, among which is the fact that in rainy weather, water accumulates on the wing and is apt to run down inside the car to the discomfort of the operator or person seated next to the wing; and this condition is aggravated according to the increase in angular setting of the wing and also due to the fact that the front portion thereof extends into the body of the car to an extent dependent upon such setting.

The present invention has for its object to provide such a "no-draft" ventilator in which the wing or forward section of the window pane admits of adequate ventilation being secured with but slight angular setting, and which further admits of the said wing being maintained in a closed non-angular setting, in cases where the weather conditions make this desirable, at the same time affording a circulation-producing deflection of air currents outwardly of the rear section of the window pane so that the said rear section may conveniently be partly lowered to permit free circulation of air about the interior of the vehicle.

More particularly, the said invention contemplates provision for a decided overlapping of the front portion of the window pane with respect to the rear portion thereof, with the said overlapping portion set at an outwardly extending acute angle to the general plane of the two sections of the window.

Still further, the said invention contemplates the provision, in an arrangement such as that immediately referred to, for a weather-proof contact between the front edge of the rear section of the window pane and the region of the junction between the main portion and the angular rear portion of the front pane section or wing; the rear section of the pane being vertically movable with respect to the said front section.

Still further objects or advantages additional or subsidiary to the aforesaid objects, or resulting from the construction or operation of the invention as it may be carried into effect, will become apparent as the said invention is hereinafter further described.

In carrying the said invention into effect, I may provide the novel construction and arrangement of parts hereinafter described by way of example, having reference to the accompanying drawing, wherein:

Figure 1 is a fragmentary elevation of an automobile body provided with a window construction embodying the said invention;

Figure 2 is a sectional plan of the same, taken on a plane indicated by the line 2—2 in Figure 1;

Figure 3 is a detail elevation of the front pane section or wing removed; and

Figure 4 is a rear elevation of the same.

Similar characters of reference indicate similar parts in the several figures of the drawing.

10 indicates the front door panel of a car having a window opening 11 provided therein, the front portion of this window opening being shown as occupied by a front pane section or wing 12 mounted in a frame 13 which is pivoted at 14 and at 15 in the said door structure; 16 indicating a winding mechanism by means of which the said wing 12 may be angularly adjusted on its pivots with respect to the general plane of the window opening, as indicated by the dotted lines in Figure 2.

17 is the rear section of the window pane adapted to be raised and lowered as by the elevating mechanism 18.

The relationship between the front and rear sections of the window pane is characterized by the fact that the front section is provided with a rearwardly extending portion 19 which is offset at an acute angle to the main portion of the wing 12 and overlaps the forward portion of the rear pane section 17, as clearly shown in Figure 2.

It is preferred that the junction between the main portion and the offset portion of the front pane section 12 be substantially arcuate, as indicated at 20, and the rear pane section 17 is shown as having its forward edge provided with a vertically disposed gasket or weatherstrip 21 contacting this arcuate portion 20 of the wing 12 when the said wing is in its closed position indicated in full lines in the said Figure 2.

It will be obvious that vertical opening and closing of the rear section 17 of the window pane may be freely effected regardless of the setting of the front section or wing either in an angularly opened or flush closed position, and that the weatherstrip 21 will have vertically sliding contact with the inner side of the wing when such wing is closed; the line of contact being well in advance of the rear edge of the said wing 12. It will also be apparent that, when the vehicle is traveling forwardly in rainy weather and the rear pane section is lowered to some extent to provide for ventilation thereabove, the angular rear portion of the front wing will deflect air currents (resulting from the motion of the vehicle) outwardly away from the opening immediately above the lowered rear pane section, thus not only promoting a circulation of air through the opening for the proper ventilation of the interior of the car but deflecting all water accumulated on the wing away from such opening and from the outer surface of the rear pane section. Under such conditions the front pane section or wing may be maintained in its closed position or may be opened to a slight angle if desired should the rain be light or the speed of the vehicle such that such angular opening would not be objectionable.

It is found that a quite desirable angular offset for the rear portion 19 of the wing 12 is approximately thirty-six degrees, although this admits of quite a little variation according to the nature and area of the window opening and the general speed at which the vehicle is expected to be driven.

It should be borne in mind that the angular setting of the rear marginal portion of the front pane does not necessarily require that this should be strictly limited to the flat form illustrated in the drawing, as there might conceivably be some curvature to this offset portion. This may especially be desirable from a manufacturing standpoint where the window pane is made of laminated glass which does not render itself to being sharply bent on a defined line, but can be bent to provide the claimed features of applicant's device even though some curvature may be maintained throughout a measure or even the entire extent of the offset portion.

This simple but important variation from common practice in "no-draft" window design greatly increases the desirability and efficiency of dual section window panes provided for the purposes outlined and has no material effect on the overall cost of manufacturing and installation of such equipment; and, among other things, overcomes one of the greatest objections to such arrangements as heretofore known in that it provides greater protection against the entrance of rain into a car without interference with ventilation. It furthermore does not increase the number of parts beyond those in common use nor does it call for special attachments or other accessories to accomplish its purposes.

It should be understood that while in its preferred form the invention contemplates the provision of means for swinging the forward pane section or wing 12 on pivots, as at 14 and 15, such means do not form an essential part of the invention and may be eliminated, the pane section being merely subjected to any manual angular adjustment. In fact, in some cases such angular adjustment may not be deemed necessary or desirable, in which case the pivots 14 and 15 may be dispensed with and the forward pane section 12 simply secured in any manner within the forward part of the window opening.

This invention may be developed within the scope of the following claim without departing from the essential features of the said invention, and it is desired that the specification and drawing be read as being merely illustrative of a practical embodiment of the same and not in a strictly limiting sense.

What I claim is:

In combination with a vehicle body having a window opening defined by a frame structure, an enclosure for said opening comprising front and rear window pane sections, means supporting said front section in the forward part of said window opening, and means supporting the rear pane section for vertical adjustment in said window opening, the rear portion of the front pane section overlapping the forward marginal portion of the rear pane section and extending at an acute angle substantially outwardly therefrom and above the lower portion of the window frame structure.

LEROY S. RAWSON.

REFERENCES CITED

The following references are of record in the file of this patent:

UNITED STATES PATENTS

| Number | Name | Date |
|---|---|---|
| 1,705,799 | Woina | Mar. 19, 1929 |
| 1,960,601 | Sullivan | May 29, 1934 |
| 2,112,330 | Carr | Mar. 29, 1938 |

FOREIGN PATENTS

| Number | Country | Date |
|---|---|---|
| 531,577 | Great Britain | Jan. 7, 1941 |